(12) United States Patent
Mowers et al.

(10) Patent No.: US 8,834,820 B1
(45) Date of Patent: Sep. 16, 2014

(54) ADAPTIVE CATALYTIC CONVERSION AND REDUCTION AGENT CONTROL

(71) Applicant: Caterpillar Inc., Peoria, IL (US)

(72) Inventors: Matthew Mowers, Peoria, IL (US); Karthik Jayasankaran, Peoria, IL (US); Deepti Bhosekar, Dunlap, IL (US); Jason Bloms, Edwards, IL (US); Joshua Ratts, East Peoria, IL (US); Aaron Harmon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/918,059

(22) Filed: Jun. 14, 2013

(51) Int. Cl.
*B01D 53/94* (2006.01)
*F01N 3/18* (2006.01)
*F01N 3/20* (2006.01)

(52) U.S. Cl.
CPC ............ *F01N 3/208* (2013.01); *B01D 53/9431* (2013.01)
USPC ........ 423/213.2; 422/105; 422/108; 422/111; 60/274; 60/299; 60/301

(58) Field of Classification Search
USPC .......... 423/213.2; 422/105, 108, 111; 60/274, 60/299, 301
See application file for complete search history.

(56) References Cited

U.S. PATENT DOCUMENTS

| | | | |
|---|---|---|---|
| 5,896,743 A | 4/1999 | Griffin | |
| 7,093,427 B2 | 8/2006 | van Nieuwstadt et al. | |
| 7,428,810 B2 | 9/2008 | Driscoll | |
| 7,614,220 B2 | 11/2009 | Breuer et al. | |
| 8,001,769 B2 | 8/2011 | Wei et al. | |
| 8,156,729 B2 | 4/2012 | Sun | |
| 2004/0074229 A1 | 4/2004 | Upadhyay et al. | |
| 2009/0031710 A1 | 2/2009 | Wei et al. | |
| 2010/0101221 A1 | 4/2010 | Charbonnel et al. | |
| 2010/0281855 A1 | 11/2010 | Sun et al. | |
| 2011/0153260 A1 | 6/2011 | Sacco et al. | |
| 2012/0067028 A1* | 3/2012 | Clerc et al. ..................... 60/274 |

FOREIGN PATENT DOCUMENTS

| | | |
|---|---|---|
| EP | 2543840 A1 | 1/2013 |
| WO | 2011/082401 A2 | 7/2011 |
| WO | 2011/138277 A1 | 11/2011 |

\* cited by examiner

*Primary Examiner* — Timothy Vanoy
(74) *Attorney, Agent, or Firm* — Baker Hostetler (57) ABSTRACT

An emissions control system includes a Selective Catalytic Reduction (SCR) device, one or more monitoring devices and one or more sensors. The system further includes a controller configured to determine an operating emissions gas conversion ratio of the SCR device. The controller is further configured to determine an injection amount of a reduction agent to maintain an operating emissions gas conversion ratio of the SCR device and to adjust the operating emissions gas conversion ratio to a target emissions gas conversion ratio by adjusting the injection amount of the reduction agent to the SCR device. The system utilizes a Time-Temperature model to determine the target emissions gas conversion ratio and/or reduction agent injection ratio. The system further includes a reduction agent injector configured to supply the adjusted injection amount of the reduction agent to the SCR device.

20 Claims, 7 Drawing Sheets

ADAPTIVE CATALYTIC CONVERSION AND REDUCTION AGENT CONTROL

TECHNICAL FIELD

The disclosure relates generally to a control for a Selective Catalytic Reduction (SCR) system that controls an amount of injected reduction agent and/or adjusts conversion targets, and more particularly, to a control for a Selective Catalytic Reduction system that controls an amount of injected reduction agent and/or adjusts conversion targets based on a time-temperature model.

BACKGROUND

Engines such as diesel or other lean burn engines generally provide more complete filet combustion and better fuel efficiency but require higher operating pressures and temperatures compared to non-lean burn engines. With the higher pressures and temperatures, nitrogen oxides ($NO_x$) emissions including nitric oxide (NO) and nitrogen dioxide ($NO_2$) are typically higher as oxygen and nitrogen tend to combine more easily at a higher temperature. $NO_x$ emissions cause a number of environmental issues such as smog, acid rain, excess aqueous nutrients and so on. Thus emissions control regulations limit the amount of $NO_x$ emissions of engines and necessitate the use of reduction devices in the exhaust systems in order to reduce the $NO_x$ emissions to an acceptable level.

A Selective Catalytic Reduction (SCR) catalyst device is typically used to control the $NO_x$ emissions of engines. The catalyst converts $NO_x$ gases into nitrogen gases and water with the aid of a reduction agent. The reduction agent typically contains hydrogen or the like which is capable of removing oxygen from $NO_x$ gases. Commonly used reduction agents are ammonia, Diesel Exhaust Fluid (DEF), urea, hydrocarbon-containing compounds and the like. The reduction agent is added to the catalyst and is adsorbed onto the catalyst to facilitate the reduction process. Typically, a solution of the reduction agent is internally or externally carried by an engine, and a supplying system injects the reduction agent into the exhaust gas stream entering the catalyst.

The reduction agent is typically adsorbed into the catalyst. The amount of reduction agent stored on the catalyst is generally proportional to the amount of $NO_x$ gases that can be converted into nitrogen gases and water. Thus, to increase the $NO_x$ conversion ratio, it is desirable to increase the amount of reduction agent stored on the catalyst. When the reduction agent supplied is not fully adsorbed on the catalyst, the remaining reduction agent that is unreacted can undesirably be carried by the exhaust flow downstream of the catalyst and is released into the atmosphere (i.e., slip).

The amount of adsorption of $NH_3$ in a SCR catalyst partially depends on a catalyst's temperature. When the catalyst operates at low temperatures, the amount of adsorption of $NH_3$ in the catalyst is high. However, at high temperatures, the amount of adsorption of $NH_3$ in the catalyst is reduced due to instability of the adsorbed $NH_3$ species and thus the $NH_3$ past the catalyst can increase. In addition to such a temperature effect, the catalyst's efficiency can degrade over time. As the catalyst ages, the storage capacity of $NH_3$ in the catalyst can decrease, thereby resulting in an increase in the amount of $NH_3$ slip. Alternatively, as the catalyst ages, the storage capacity of $NH_3$ in the catalyst can increase, thereby resulting in a decrease in the amount of $NH_3$ slip. Thus, the efficiency of the catalyst and the amount of $NH_3$ slip past the catalyst depends, in part, on the service time and temperature of the catalyst.

One way to minimize the impact of the aging and to avoid $NH_3$ slip in a SCR catalyst is to optimize operating conditions of the catalyst. In this approach, a SCR catalyst is operated for a predetermined period of time to determine a stable $NO_x$ reduction ratio, $NH_3$ storage, and $NH_3$ slip of the catalyst. Based on the determined stable $NO_x$ reduction ratio, $NH_3$ storage, and $NH_3$ slip, the operating conditions of the catalyst are determined. However, this approach has some drawbacks because an engine does not always operate under the same conditions over the life of the catalyst.

An alternative method of controlling an SCR process is described in U.S. Pat. No. 8,156,729 (the '729 patent) issued to Sun on Apr. 17, 2012. The '729 patent discloses steps for determining the age of the SCR with an age factor; determining SCR efficiency by using SCR age as a factor with an age factor; determining desired engine out $NO_x$ emission by using current SCR efficiency and desired tailpipe NOx emissions; managing engine control setpoints which form a forward control portion of the ECS by using fuzzy logic; and controlling engine out $NO_x$ emissions by using closed loop engine out $NO_x$ sensor feedback. However, this approach does not determine the necessary amount of a reduction agent to maintain the desired engine out $NO_x$ emission. The desired engine out $NO_x$ emission changes as the catalyst ages. However, without determining the necessary amount of the reduction agent to cope with the changing desired $NO_x$ reduction ratio over time, unnecessarily large amounts of a reduction agent can be supplied to the aging catalyst, thereby causing excess $NH_3$ slip past the catalyst.

Accordingly, there is a need for a system which efficiently utilizes a SCR device, achieves low $NO_x$ emissions, minimizes $NH_3$ slip past the catalyst and/or increases fuel efficiency for an engine based on more accurate aging information.

BRIEF SUMMARY

In one aspect, the disclosure is directed to a method for controlling an emissions gas reduction with a Selective Catalytic Reduction (SCR) device where the method includes: monitoring operating conditions of the SCR device, wherein the SCR device is supplied with a reduction agent; obtaining an operating time and an operating temperature of the SCR device; determining a target emissions gas conversion ratio of the SCR device based on the monitored operating conditions; determining an injection amount of the reduction agent to the SCR device based on the monitored operating conditions; optionally calculating an aging descriptor of the SCR device based on the obtained time and temperature of the SCR device; and supplying an injection amount of the reduction agent to the SCR device based on the determined target emissions gas conversion ratio and the monitored operating conditions.

In another aspect, the disclosure is directed to a system for use with a Selective Catalytic Reduction (SCR) device in an internal combustion engine where the system includes: means for monitoring operating conditions of the SCR device wherein the operating conditions include an operating time and an operating temperature of the SCR device; means for determining an operating emissions gas conversion ratio of the SCR device; means for calculating a number of active sites for catalytic reaction of the SCR device at the operating time and the operating temperature of the SCR device; means for determining an aging time of the SCR device based on the calculated number of active sites for catalytic reaction at the operating time at the operating temperature of the SCR device; means for determining a target emissions conversion ratio of the SCR device based on the monitored operating conditions of the SCR device; and means for adjusting an injection amount of the reduction agent to the SCR device necessary for maintaining the target emissions gas conversion ratio of the SCR device when an excess amount of the reduction agent downstream of the SCR device is not negligible.

DETAILED DESCRIPTION

The disclosure sets forth a process and device to compensate for fluctuating reduction agent slip with age by adjusting emissions gas conversion targets. This may be necessary because sensors used to observe emissions gas conversion are cross-sensitive to reduction agent and may indicate decreased emissions gas conversion in the presence of remnant reduction agent. The process and device set forth in the disclosure corrects for expected reduction agent slip by reducing necessary emissions gas conversion amounts being measured by the sensors. Moreover, the disclosed process and device also includes self-healing conversion target capability to increase conversion targets if reduced emissions gas conversion or increased reduction agent slip have been determined to be temporary events.

The process and device set forth in the disclosure monitors catalyst temperature to track hydrothermal aging using a time at temperature equation developed on a catalyst hydrothermal aging bench. As a catalyst hydrothermally ages, this compensation process and device may adjust reduction agent dosing rates to compensate for an increase or decrease of reduction agent utilization that results from hydrothermal aging.

Figure 1:
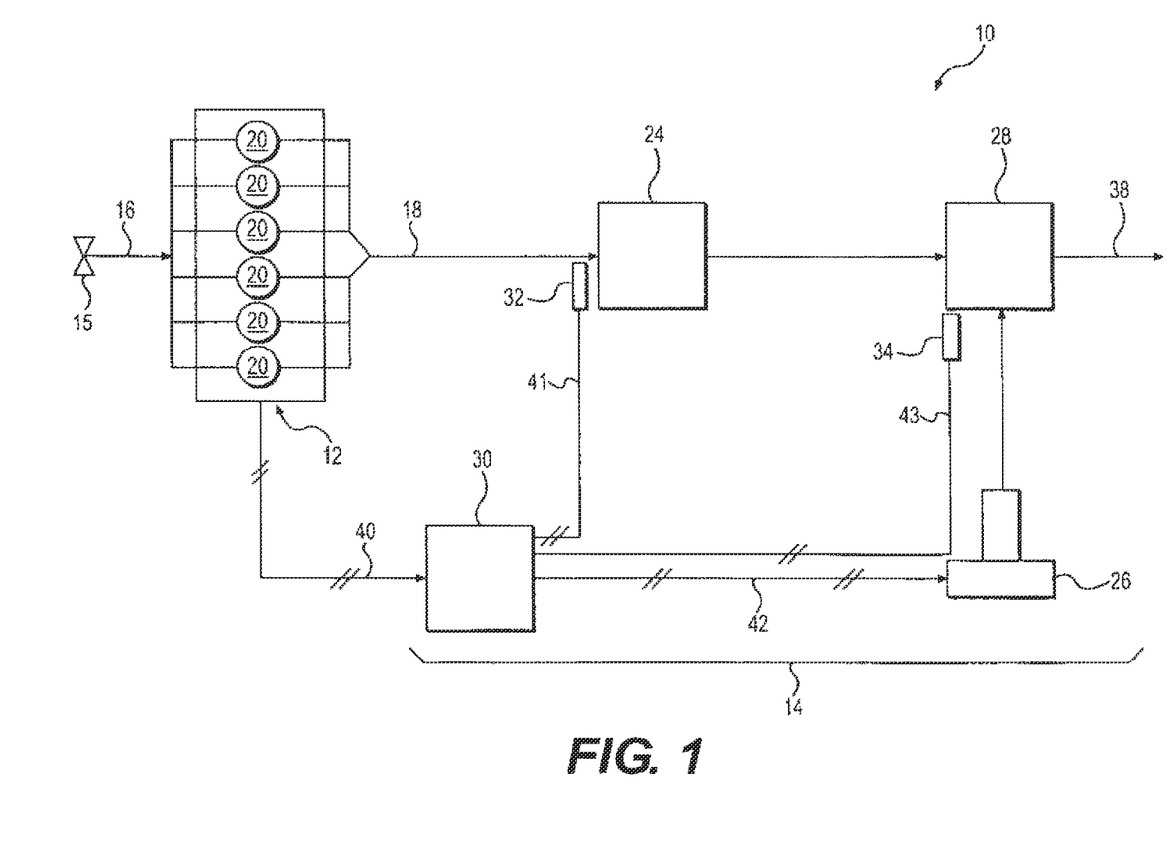
FIG. 1 is a diagrammatic illustration of an exemplary disclosed emissions control system according to the disclosure.

FIG. 1 is a diagrammatic illustration of an exemplary disclosed emissions control system according to the disclosure. In particular, FIG. 1 illustrates a diagrammatic representation of Emissions control system 10 including Power source 12 and Emissions controller 14. Power source 12 may have a plurality of combustion chambers 20 that convert potential chemical energy (usually in the form of a combustible gas) into useful mechanical work. Power source 12 may receive air via Passageway 16 and may output an exhaust flow via Passageway 18. Air may enter Fluid system 10 via Induction valve 15. Induction valve 15 may fluidly communicate with Passageway 16 to direct air through an intake manifold (not shown) and into Power source 12. Emissions controller 14 may reduce emissions of harmful gasses and particulate matter emitted from Power source 12 after a combustion process. Emissions controller 14 may include Filtering device 24, Injector 26, Selective Catalytic Reduction ("SCR") device 28, Sensors 32, 34, and Controller 30.

Filtering device 24 may filter particulate matter, soot, and/or chemicals from the exhaust flow before the flow is released into the atmosphere via Passageway 18. As the exhaust flow interacts with a catalyst, hydrocarbons and/or other chemicals in the exhaust flow may be oxidized. The catalyst material in the Filtering device 24 may also increase the amount of exhaust gases, such as $NO_2$, in the exhaust flow to improve a passive regeneration capacity and a reduction efficiency of other gases, such as $NO_x$.

Sensors 32, 34 may be devices configured to measure changes in Emissions control system 10. Sensor 32 may be located at or upstream of Filtering device 24 and may be configured to measure a temperature change approaching SCR device 28. For example, Sensor 32 may be located at an inlet of Filtering device 24, at a location along the length of Passageway 18, or at an outlet of Power source 12. Optionally, Sensor 34 may be located at or upstream of SCR device 28 but downstream of Filtering device 24. Sensor 34 may be configured to measure a temperature of SCR device 28 or the exhaust flow near SCR device 28. In particular, Sensor 34 may measure a temperature at an inlet of SCR device 28.

SCR device 28 may be a flow-through device configured to catalyze a reaction between exhaust gases, such as $NO_x$, and a reduction agent. Injector 26 may inject a reduction agent to dose a surface of SCR device 28. Injector 26 may be located at or upstream of SCR device 28 and may embody any type of fluid injector known in the art. Injector 26 may fluidly communicate with a reduction agent supply tank (not shown) to provide for repeated injections of the reduction agent.

Controller 30 may embody a single microprocessor or multiple microprocessors that include a means for controlling an amount of reduction agent injected by Injector 26. Numerous commercially available microprocessors may be configured to perform the functions of Controller 30. Controller 30 may communicate with Power source 12 via Communication line 40, Sensor 32 via Communication line 41, Sensor 34 via Communication line 43, and Injector 26 via Communication line 42. It is contemplated that Controller 30 may communicate with other machine sensors (not shown), such as gas sensors, $NO_x$ sensors, $NH_3$ sensors, mass flow rate sensors, and/or any other fluid system sensors that may provide information related to the operational characteristics of Emissions controller 14. A gas conversion efficiency, such as NO conversion efficiency, of SCR device 28, may be subjected to declines due to hydrothermal aging. Thus, Controller 30 may be programmed to control the operating gas conversion ratio of SCR device 28, thereby ensuring that the emissions, such as $NO_x$ emissions, from SCR device 28 conform to legislative or other requirements.

Figure 2:
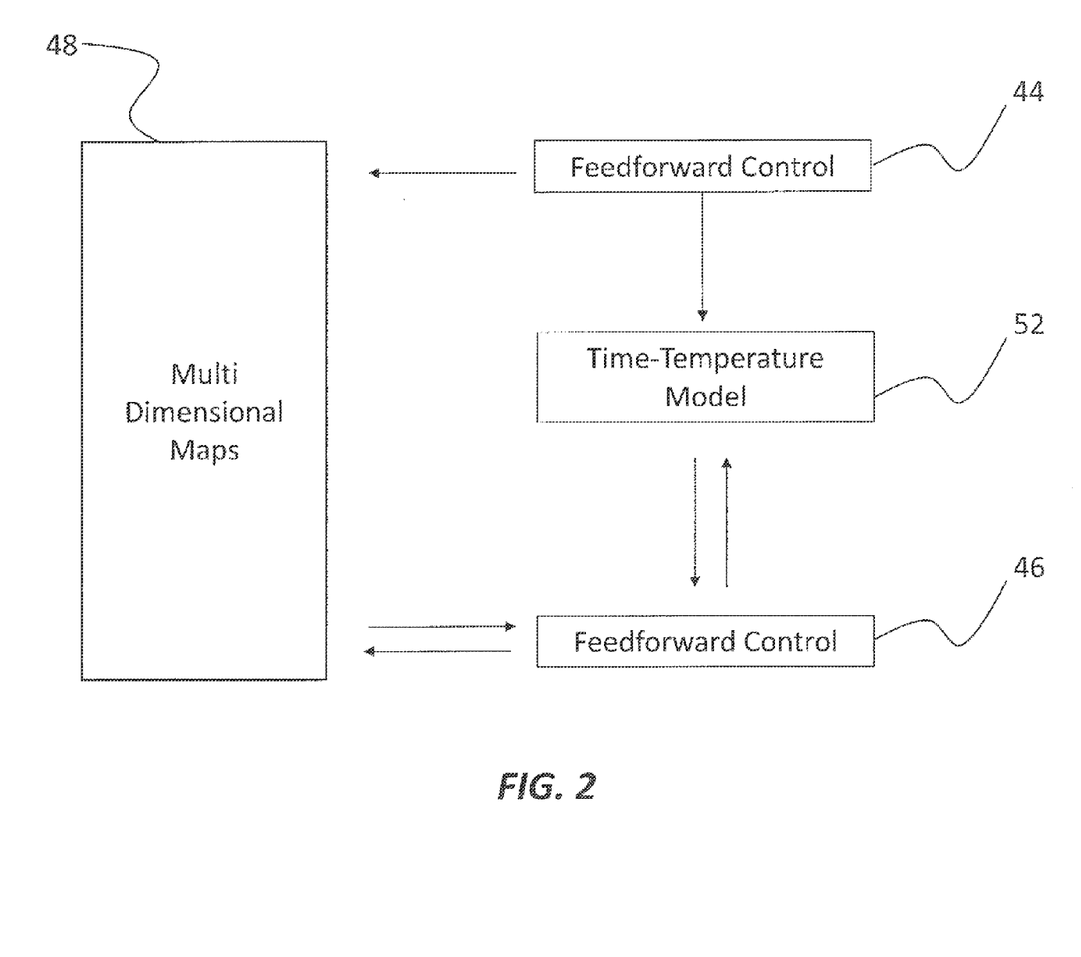
FIG. 2 is a programming diagram incorporating a time-temperature model in the disclosed emissions control system of FIG. 1 according to the disclosure.

FIG. 2 is a programming diagram incorporating a time-temperature model in the disclosed control system of FIG. 1 according to the disclosure. In particular, FIG. 2 shows a programming diagram of Controller 30 that may include internal logic/programming that allows Controller 30 to calculate one or more outputs, given one or more inputs. For example, Controller 30 may include programming defining First feedforward control 44. First feedforward control 44 may be a model based control, such as, for example, a virtual state feedback controller with a feedback gain. Other types of control are contemplated as well.

Second feedforward control 46 may have one or more inputs and one or more outputs. Second feedforward control 46 may be connected to Time-Temperature model 52. Time-Temperature model 52 may be used to track hydrothermal aging using a time at temperature equation dependent on catalyst hydrothermal aging. The amount of aging or the utilization of reduction agent can be tracked with an aging descriptor. Time-Temperature model 52, which is based on an aging descriptor, may produce a number of active sites for reduction agent oxidation in SCR device 28.

The aging descriptor in SCR device 28 may be determined by the following equation (1):

$$\text{Aging Descriptor} = f(t, \text{Temp}) \quad (1).$$

In a particular implementation, the aging descriptor may include the number of active sites for reduction agent oxidation in SCR device 28 determined by the following equation (2):

$$\text{Active Sites}(t, \text{Temp}) = \text{Active Sites}(t-1) + \Delta t \times (-k_0 \times e^{(-Ea/8.314/(\text{Temp}+273))}) \times (\text{Active sites}(t-1) - eq)^{\text{Order}} \quad (2),$$

where: t is one of time and a number of temperature measurements, wherein t may be an integer greater than zero; $\Delta t$ is the time step for the measurement of Temp, Temp is a temperature of SCR device 28 in Celsius; Active Sites (t) is a number of active sites of reduction agent oxidation at t in SCR device 28; Active Sites (t−1) is a number of active sites of reduction agent oxidation at previous time t−1 in SCR device 28; and ko, Ea, Order and eq are constants related to a type of SCR device 28. As detailed in the equations (1) and (2), the active sites for reduction agent oxidation, such as ammonia oxidation, in SCR device 28 change as a function of time and temperature of SCR device 28, where the fluctuating operating temperature of SCR device 28 is coupled with the increasing operating time of SCR device 28. Based on the obtained active sites, the aging time of SCR device 28 may be determined by the following equation (3):

$$\text{Age}(t) = f(Ta, \text{Active Sites}(t)) \quad (3),$$

In a particular implementation, based on the obtained active sites, the aging time of SCR device 28 may be determined by the following equation (4):

$$\text{Age}(t) = 1/(k_0 \times e^{-(Ea/8.314/(273+Ta))}) \times (1/(\text{Active Sites}(t) - eq) - 1/(1-eq)) \quad (4),$$

where: Age (t) is an aged time of SCR device 28 at t, wherein t may be an integer greater than zero; Active Sites (t) is a number of active sites of reduction agent oxidation at t in SCR device 28; Ta is a reference temperature; and ko, Ea, and eq are constants related to a type of SCR device 28.

As described in equations (3) and (4), Time-Temperature model 52 may standardize the aging time of SCR device 28 having the operating time, t, at the operating temperature, Temp, with respect to the reference temperature Ta. Additionally, Time-Temperature model 52 may enable the aging time of SCR device 28 to be presented with respect to the life cycle of SCR device 28 at a certain reference aging temperature. To correlate the life cycle of SCR device 28 with the aging time, an aging shift may be employed.

Figure 3:
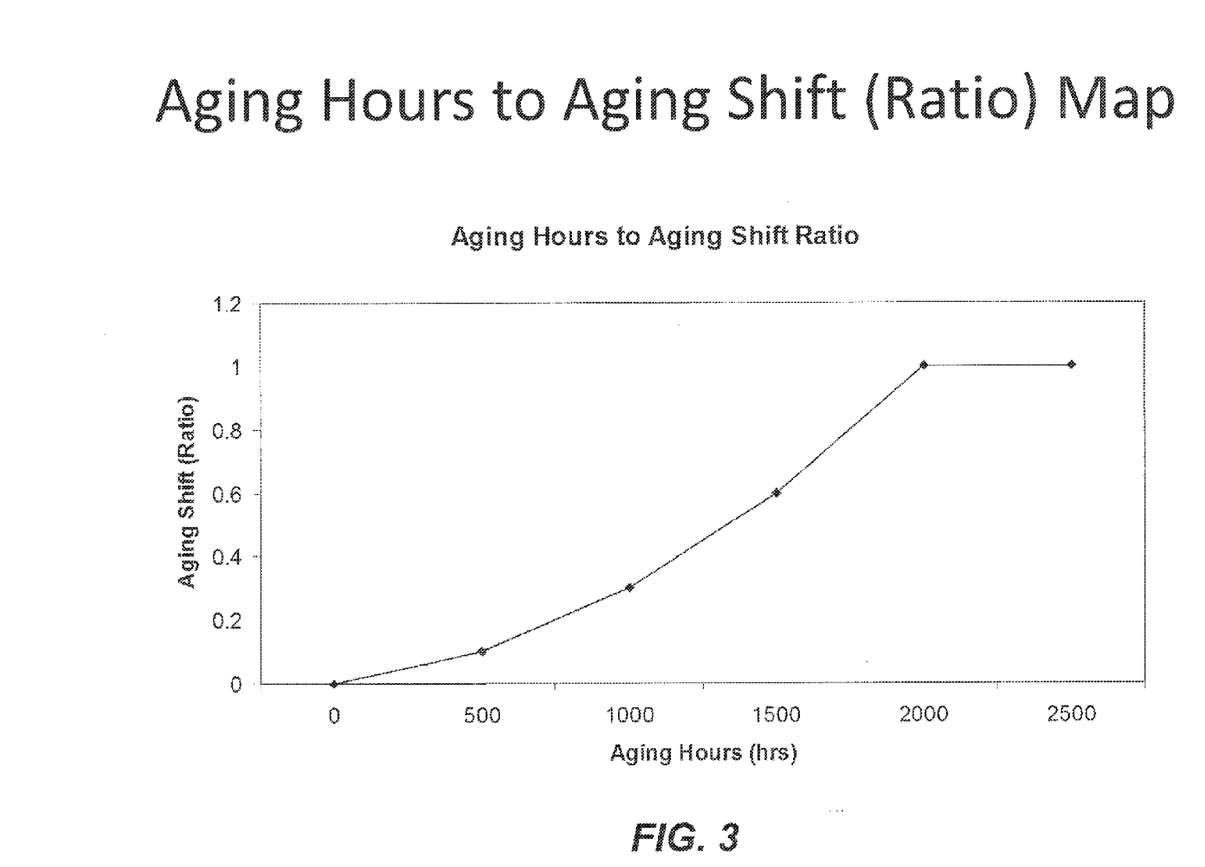
FIG. 3 is a graph showing an aging shift ratio as a function of aging time at a reference aging temperature according to the disclosure.

FIG. 3 is a graph showing an aging shift ratio as a function of aging time at a reference aging temperature according to the disclosure. At the reference temperature, Ta=525° C., the aging shift of the SCR device changes from 0 to 1 over 2000 hrs. where the SCR device reaches the end of life when aging shift=1. It is contemplated that the reference aging temperature may be a temperature in a range of from 200 to 800° C., preferably from 350 to 600° C. Other SCR devices may utilize different values for Ea, ko, eq and Ta.

Figure 4:
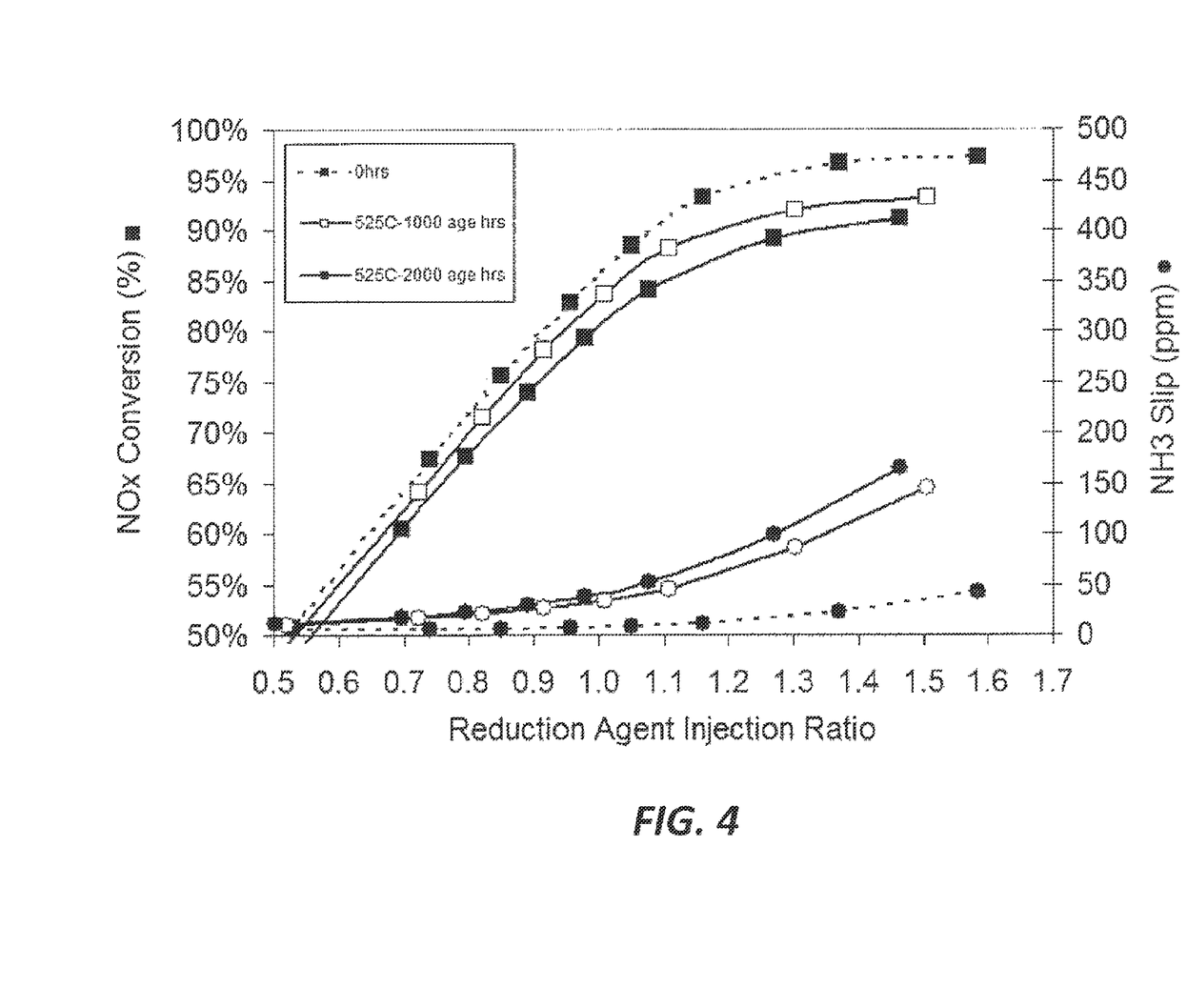
FIG. 4 is a plot showing a relationship among operating temperature, aging time, amount of reduction agent slip, injection amount of reduction agent and gas conversion ratio.

Time-Temperature model 52 may allow accurate gas conversion control, such as $NO_x$ conversion control, and proper limiting of reduction agent slip, such as $NH_3$ slip. FIG. 4 is a plot showing a relationship among operating temperature, aging time, reduction agent slip, injection amount of reduction agent and gas conversion ratio where the operating temperature of the catalyst is 450° C. The different lines of the plot represent a catalyst which has been aged for a specified time at 525° C. where Ea=147 kJ, ko=2224.44/s, eq=0.12, and Ta=525° C. and the data was generated by measuring the performance of catalyst core samples on a catalyst test bench. The reduction agent injection ratio in FIG. 4 is a scaled value of the injection amount of reduction agent referenced to the amount of $NO_x$ present in the exhaust. As shown in FIG. 4, Time-Temperature model 52 can be utilized to show how the gas conversion ratio and the amount of reduction agent slip vary as a function of the injection amount of reduction agent and as a function of aging time at a given operating temperature. Similarly, Time-Temperature model 52 can be utilized to show how the gas conversion ratio and the amount of reduction agent slip may vary as a function of the injection amount of reduction agent and as a function of an operating temperature. In some aspects, the operating gas conversion ratio may be incrementally or decrementally adjusted to a target gas conversion ratio by adjusting an injection amount of reduction agent to SCR device 28. In various aspects, the operating gas conversion ratio may be adjusted when an amount of reduction agent slip past SCR device 28 is not negligible.

Controller 30 may track the aging shift obtained during the operation of SCR device 28. Controller 30 may further determine an aging descriptor, a number of active sites for catalytic reaction, such as oxidation, an amount of reduction agent slip and a gas conversion ratio of SCR device 28, and an injection amount of reduction agent to SCR device 28. Inputs to Controller 30 may include values at the beginning of life and the end of life of SCR device 28. For example, $NO_x$ conversion ratios at the beginning of and the end of life of SCR device 28 may be fed to the Controller 30.

The outputs of Controller 30 may further include a target gas conversion ratio, such as $NO_x$ conversion ratio, of SCR device 28. Considering the changes in the operating temperature of SCR device 28 over time, Controller 30 may incorporate the calculated number of active sites for oxidation in SCR device 28 to determine a target gas conversion ratio of SCR device 28. The target gas conversion ratio may be obtained from a formula or an empirical lookup table as a function of available active sites. Similarly, the amount of reduction agent may also be determined from a formula or an empirical lookup table as a function of available active sites.

Controller 30 may utilize one or more multi-dimensional Maps 48. Multi-dimensional Maps 48 may be generated from steady-state simulations and/or empirical data and may include equations, graphs and/or tables related to the operational characteristics of SCR device 28. For example, Maps 48 may include equations, graphs and/or tables that relate a SCR device temperature (either measured or predicted) to an ability of SCR device 28 to store reduction agent and to convert emissions gases. The inputs of Maps 48 may include engine air mass flow rate, inlet gas ratio, inlet $NO_2$ over $NO_x$ ratio, inlet pressure, and inlet temperature of SCR device 28, ambient temperature, a total fuel quantity and/or engine speed. It is contemplated that Maps 48 may further include other formulations and weighting and may include further inputs, such as, a space velocity and the like.

Controller 30 in communication with sensors, such as gas sensors, $NO_x$ sensors, $NH_3$ sensors, mass flow rate sensors, and/or any other fluid system sensors may determine an amount of reduction agent to be supplied to SCR device 28. The outputs of Maps 48 may include one or more of operating gas conversion ratios, an operating $NO_x$ conversion ratio, a value of aging shift, a target gas conversion ratio, a target $NO_x$ conversion ratio, an amount of reduction agent slip, an amount of $NH_3$ slip, a current amount of reduction agent being supplied to SCR device 28, and an injection amount of reduction agent to SCR device 28 to maintain the target gas conversion ratio. Subsequently, Controller 30 may adjust the operating gas conversion ratio of SCR device 28 to the determined target gas conversion ratio by adjusting an injection amount of reduction agent to SCR device 28 in the interest of protecting against excessive reduction agent slip.

Figure 5:
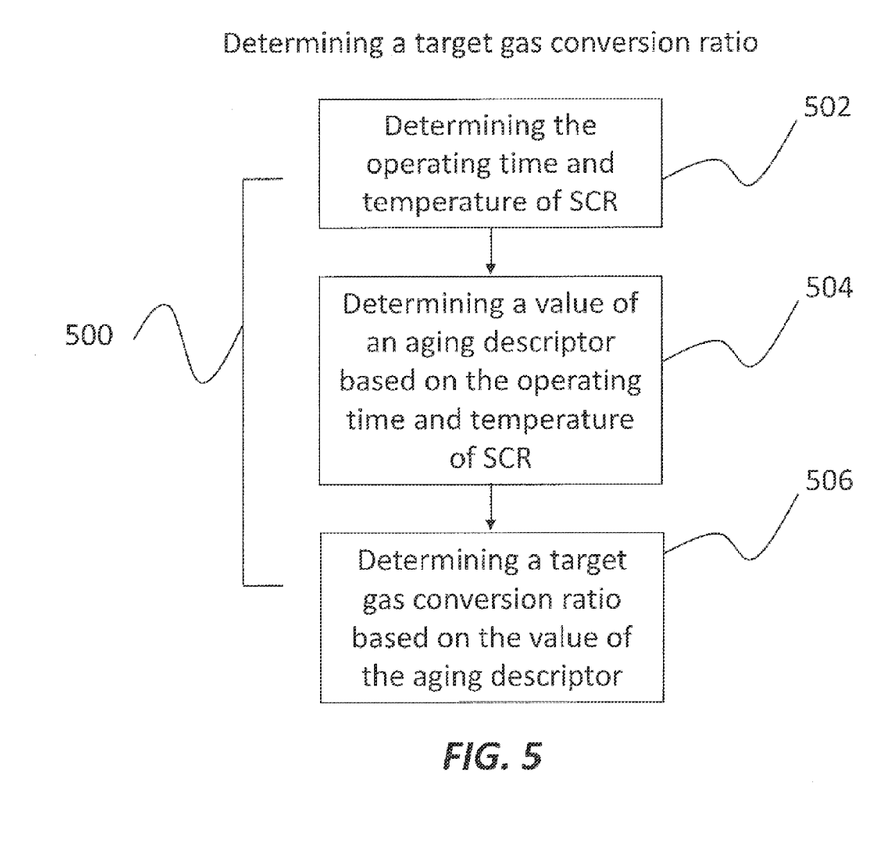
FIG. 5 is a schematic representation of steps to determine a target gas conversion ratio according to the disclosure.

FIG. 5 is a schematic representation of steps to determine a target gas conversion ratio according to the disclosure. In particular, FIG. 5 shows process steps 500 including a step 502 of determining operating time and temperature of SCR device 28, a step 504 of determining a value of an aging descriptor based on the operating time and temperature of SCR device 28, and a step 506 of determining a target gas conversion ratio based on the determined value of the aging descriptor. Thereafter, Power source 12 is operated using the target gas conversion ratio determined in step 506.

Figure 6:
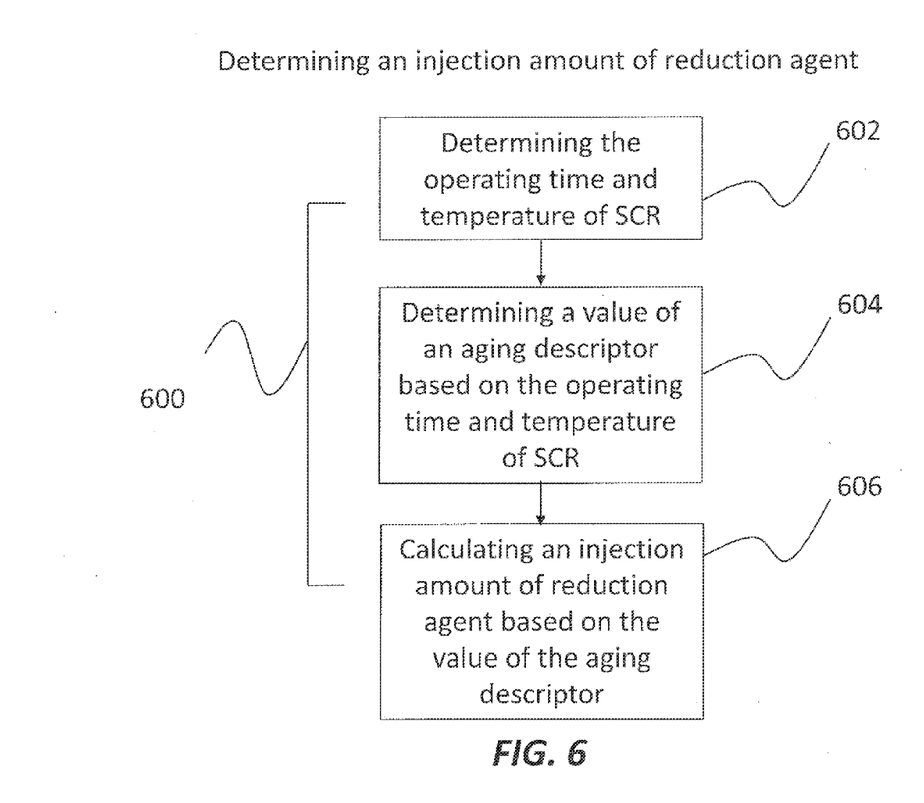
FIG. 6 is shows a diagram of steps to determine an injection amount of a reduction agent according to the disclosure.

FIG. 6 is a diagram of steps to determine an injection amount of a reduction agent according to the disclosure. In particular, FIG. 6 shows process steps 600 including a step 602 of determining operating time and temperature of SCR device 28, a step 604 of determining a value of an aging descriptor based on the operating time and temperature of SCR device 28, and a step 606 of determining an injection amount of a reduction agent based on the determined value of the aging descriptor. Thereafter, Power source 12 is operated using the injection amount of the reduction agent determined in step 606.

Figure 7:
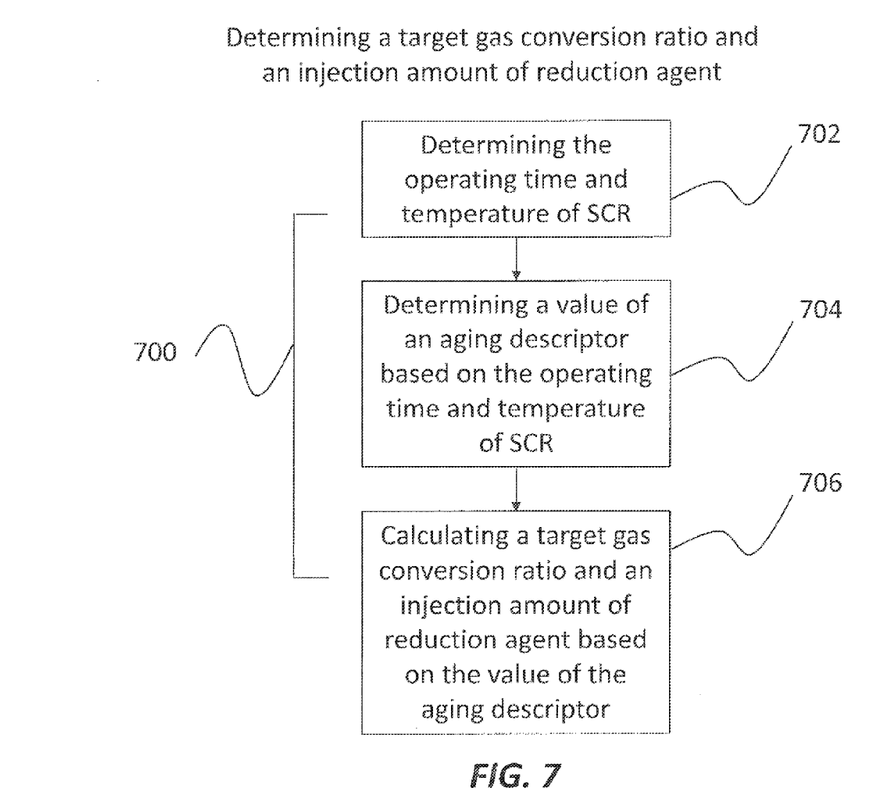
FIG. 7 is a diagram describing a conjugated process of the target gas conversion ratio and the injection amount of a reduction agent according to the disclosure.

FIG. 7 is a diagram describing a conjugated process of the target gas conversion ratio and the injection amount of a reduction agent according to the disclosure. In particular, FIG. 7 shows process steps 700 including a step 702 of determining the operating time and temperature of SCR device 28, a step 704 of determining a value of an aging descriptor based on the operating time and temperature of SCR device 28, and a step 706 of determining a target gas conversion ratio and an injection amount of a reduction agent based on the determined value of the aging descriptor. Thereafter, Power source 12 is operated using the target gas conversion ratio and the injection amount of the reduction agent determined in step 706.

INDUSTRIAL APPLICABILITY

The disclosure may be applicable to any emissions control system where control of an SCR process is desired. Specifically, the disclosure may have a controller with an internal model that calculates, in real-time, a desired emissions conversion ratio and/or an amount of injected reduction agent required to react with emissions gases in the exhaust flow and prevent slip.

Power source 12 may embody a combustion engine, such as, for example, a diesel engine, a gasoline engine, a gaseous fuel-powered engine (e.g., a natural gas engine), or any other type of combustion engine known to one skilled in the art. It is also considered that Power source 12 may embody a furnace or a similar non-engine device.

In one aspect, Emissions control system 10 may include other devices, such as, for example, a diesel oxidation device, an ammonia oxidation device, additional injectors and/or filters, and other devices known in the art. The filtering elements of Filtering device 24 may include any appropriate filter material, such as, for example, foam cordierite, sintered metal, paper, ceramic, silicon carbide, aluminum titanate, or any combination thereof. The filtering elements of Filtering device 24 may also include an active catalyst layer that includes any suitable catalytic material, such as, for example, platinum, aluminum, palladium, rhodium, barium, cerium, alkali metals, alkaline-earth metals, rare-earth metals, or any combinations thereof.

Sensors 32, 34 may include thermocouples, fiber optic devices, infrared devices, or any other type of temperature sensing device. Sensors 32, 34 may further include a device capable of tracking or recording time. SCR device 28 may include a device, or specifically, a device support material and a metal promoter dispersed within the device support material. The device support material may include any suitable catalytic material, such as, for example, platinum, aluminum, palladium, rhodium, barium, cerium, alkali metals, alkaline-earth metals, rare-earth metals, or any combinations thereof. In one aspect, the device support material may include at least one of alumina, zeolite, titania, aluminophosphates, hexyluminates, aluminosilicates, zirconates, titanosilicates, perovskites, manganese based compounds and titanates. In some aspects, the device support material may include at least one of alumina and zeolite. The metal promoter may include copper, iron, vanadia, iron vanadate, or silver metal. Combinations of these materials may be used, and the device support material may be chosen based on the type of fuel used, the ethanol additive used, the air to fuel-vapor ratio desired, and/or for conformity with environmental standards.

The reduction agent may be, for example, gaseous ammonia, ammonia in aqueous solution, aqueous urea, ammonia from an ammonia generator (not shown), Diesel Exhaust Fluid (DEF) or the like. However, any suitable compound that is catalytically reactive with emissions gases may be considered as a reduction agent. When the reduction agent is a compound such as urea, it may undergo a hydrolysis process upon injection into the exhaust flow. During the hydrolysis process, the urea may decompose into byproducts, including, for example, gaseous $NH_3$ and carbon dioxide. The $NH_3$ from the urea may then be stored on the surface of SCR device 28 to react with and reduce the $NO_x$. It is also contemplated that the reduction agent may be ammonia that may be directly absorbed by SCR device 28.

It should be appreciated that Controller 30 may readily embody a general machine microprocessor capable of controlling numerous machine functions. Alternatively, Controller 30 may include a plurality of modules each of which performs one or more designated functions. In addition, various other circuits may be associated with Controller 30, such as power supply circuitry, signal conditioning circuitry, data acquisition circuitry, signal output circuitry, signal amplification circuitry, and other types of circuitry.

Referring to FIG. 1, atmospheric air may be drawn into Emissions control system 10 via Induction valve 15 and communicated via Passageway 16 to Power source 12. Induction valve 15 may embody a butterfly valve, a gate valve, a ball valve, a globe valve, a cam operated valve or any other type of valve known in the art. Induction valve 15 may be solenoid-actuated, hydraulically-actuated, pneumatically-actuated, mechanically-actuated or actuated in any other manner.

Fuel may be mixed with the air before entering Combustion chambers 20, and the fuel-air mixture may be combusted by Power source 12 to produce mechanical work and an exhaust flow. For example, fuel may be added using an injection system. The exhaust flow may contain a complex mixture of air pollutants and particulate matter. The exhaust flow may be communicated via Passageway 18 to Filtering device 24, wherein it may pass through the one or more filtering elements to remove particulate matter from the exhaust flow. It is contemplated that the particulate matter, when deposited on the filtering elements of Filtering device 24, may be passively and/or actively regenerated.

The exhaust flow exiting Filtering device 24 may be committed to SCR device 28, wherein the emissions gases in the exhaust flow may be reduced. In one aspect, Controller 30 may be configured to command Injector 26 to inject a reduction agent into the exhaust flow at or upstream of SCR device 28. Controller 30 may include programming that allows Controller 30 to selectively actuate Injector 26.

In one aspect, SCR device 28 may be integrated to Filtering device 24 or to any other devices in Emissions controller 14. For example, SCR device 28 may be integrated to Filtering device 24 by coating Filtering device 24 with SCR device supporting materials. Similarly, SCR device 28 may be integrated to one or more devices, such as diesel particulate filter, in the exhaustion system of an engine.

Referring to FIG. 2, during operation of Controller 30, First feedforward control 44 may receive one or more inputs. In one aspect, First feedforward control 44 may include one or more of modules each of which performs one or more designated functions. The inputs to First feedforward control 44 may be referenced to Maps 48 to obtain a number of active sites for catalytic reaction, an aging time, a value of aging shift. Outputs of Second feedforward control 46 may include a number of active sites for catalytic reaction, an aging time, aging shift, a target emissions gas conversion ratio of SCR device 28 and a necessary injection amount of reduction agent to SCR device 28 to maintain the target emissions conversion ratio. It is contemplated that Second feedforward control 46 may include one or more modules each of which performs one or more designated functions. In one aspect, the target emissions gas conversion ratio at the determined aging time may be computed with a value obtained by multiplying the aging shift by the difference in emissions gas conversion ratio between the beginning of life and the end of life of SCR device 28. It is contemplated that an operating emissions gas conversion ratio of SCR device 28 may be determined downstream of SCR device 28. In another aspect, Controller 30 may adjust an operating emissions gas conversion ratio of SCR device 28 to a target emissions gas conversion ratio by adjusting an injection amount of reduction agent to SCR device 28. In stilt another aspect, Controller 30 may adjust an operating emissions gas conversion ratio of SCR device 28 to a target emissions gas conversion ratio in one or more iterations each of which may adjust the injection amount of reduction agent to SCR device 28 with a step amount. The step amount may be any desired amount. It is contemplated that the range of the step amount may be from 0.5 to 1% of an amount of reduction agent previously injected to SCR device 28. In still another aspect, Controller 30 may adjust an operating emissions gas conversion ratio of SCR device 28 to a target emissions gas conversion ratio when an amount of remnant reduction agent past SCR device 28 is not negligible.

Considering the catalytic reaction between the SCR supporting materials and the reduction agent, the degree of adjusting an operating emissions gas conversion ratio of SCR device 28 to a target emissions gas conversion ratio and/or adjusting the injection amount of reduction agent to SCR device 28 may depend on the type of the SCR supporting materials.

In one aspect, SCR device 28 may control emissions of one or more of $NO_x$, $CO_2$ or any other greenhouse gases. In some aspects, the operating emissions gas conversion ratio of SCR device 28 may satisfy emissions control regulations. For instance, if emissions control regulations require a 90% conversion level of $NO_x$ to unregulated emissions (e.g., $N_2$ and $H_2O$), a SCR catalyst and reduction agent injection controls are designed to provide 95% conversion at the start of the catalyst life. Subsequently, the reduction agent injection controls may be adjusted at the end of catalyst life to provide a lesser degree of conversion, e.g., 92%.

Essentially, the SCR catalyst may be designed to exceed the minimum regulatory goal of 90%. This is done so that, from a validation perspective, there is a wide confidence interval that statistically the SCR catalyst will meet the emission requirements regardless of assembly and material constituent variances of the SCR catalyst. Shifting the operating conversion efficiency at the end in the SCR catalyst's lifetime may be advantageous, especially from a perspective of reduced reduction agent slip. For example, in order to meet a 95% conversion efficiency for NO on an aged catalyst, large amounts of reduction agent may be required as compared with meeting a 91% conversion efficiency but excess reduction agent may not be totally adsorbed onto the SCR catalyst or reacted over the SCR, leading to reduction agent slip past the SCR catalyst. Therefore, reducing the injection amount of reduction agent to the SCR catalyst and adjusting the operating conversion efficiency may prevent excess reduction agent from being injected to the SCR catalyst. It is contemplated that an operating $NO_x$ conversion ratio of SCR device 28 may be 80% or higher, preferably 90% or higher. The adjusted values of reduction agent and operating $NO_x$ conversion ratio may be communicated to Injector 26 and may also be fed back in Time-Temperature model 52.

Although specific exemplary aspects of the disclosure have been described, internal and external components and configurations may be implemented in reverse to provide the same benefits provided by the inventive aspects described. In addition, it will be appreciated by one skilled in the art that other related items can be incorporated and used along with aspects derived from the disclosure.

The many features and advantages of the disclosure are apparent from the detailed specification, and thus, it is intended by the appended claims to case all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

We claim:

1. A method for controlling an emissions gas reduction with a Selective Catalytic Reduction (SCR) device, comprising:
   monitoring operating conditions of the SCR device, wherein the SCR device is supplied with a reduction agent;
   obtaining an operating time and an operating temperature of the SCR device;
   determining a target emissions gas conversion ratio of the SCR device based on the monitored operating conditions;
   determining an injection amount of the reduction agent to the SCR device based on the monitored operating conditions; and
   supplying an injection amount of the reduction agent to the SCR device based on the determined target emissions gas conversion ratio and the monitored operating conditions.

2. The method according to claim 1, further comprising:
calculating an aging descriptor of the SCR device based on the obtained time and the obtained temperature of the SCR device.

3. The method according to claim 1, wherein the monitoring operating conditions of the SCR device is performed one or more times per minute.

4. The method according to claim 1, further comprising monitoring and analyzing a mass flow in the SCR device.

5. The method according to claim 2, wherein the aging descriptor comprises a number of active sites for catalytic reaction, wherein the number of active sites for catalytic reaction is determined by the following equation (1):

$$\text{Active Sites}(t, \text{Temp}) = \text{Active Sites}(t-1) + \Delta t \times (-k_o \times e^{(-Ea/8.314/(Temp+273))}) \times (\text{Active sites}(t-1-eq)^{Order} \quad (1),$$

where:
t is one of time and a number of temperature measurements, wherein t is an integer greater than zero;
Temp is a temperature of the SCR device;
$\Delta t$ is the time step for the measurement of Temp;
Active Sites (t) is a number of active sites for catalytic reaction at Temp at t;
Active Sites (t−1) is a number of active sites for catalytic reaction at t−1; and
ko, Ea, Order, and eq are constants related to a type of the SCR device.

6. The method according to claim 1, further comprising adjusting the injection amount of the reduction agent to the SCR device when an excess amount of the reduction agent slip downstream of the SCR device is not negligible.

7. The method according to claim 1, wherein the SCR device comprises copper zeolite.

8. The method according to claim 1, further comprising adjusting an operating emissions gas conversion ratio to the determined target emissions gas conversion ratio in one or more iterations,
wherein each iteration adjusts the injection amount of reduction agent to the SCR device with a step amount.

9. The method according to claim 8, wherein a range of the step amount is from 0.5 to 1% of an amount of reduction agent previously injected to the SCR device.

10. The method according to claim 1, further comprising:
determining an aging time of the SCR device based on the calculated number of active sites for catalytic reaction; and
determining the target emissions gas conversion ratio of the SCR device based on the determined aging time of the SCR device.

11. The method according to claim 1, further comprising obtaining an aging time of the SCR device having the obtained operating time at the obtained operating temperature with respect to a reference temperature.

12. The method according to claim 11, wherein the reference aging temperature is a temperature in a range of from 350 to 600° C.

13. An emissions reduction system, comprising:
a Selective Catalytic Reduction (SCR) device;
one or more monitoring devices configured to monitor operating conditions of the SCR device;
one or more sensors configured to obtain an operating time and an operating temperature of the SCR device;
a controller configured to determine an operating emissions gas conversion ratio of the SCR device, wherein the controller is further configured to determine an injection amount of a reduction agent to maintain the operating emissions gas conversion ratio of the SCR device and to adjust the operating emissions gas conversion ratio to a target emissions gas conversion ratio by adjusting the injection amount of the reduction agent to the SCR device; and
a reduction agent injector configured to supply the adjusted injection amount of the reduction agent to the SCR device.

14. The emissions reduction system according to claim 13, wherein the controller is further configured to calculate a number of active sites for catalytic reaction of the SCR device based on the operating time and the operating temperature of the SCR device.

15. The emissions reduction system according to claim 13, wherein the controller is further configured to determine an aging time of the SCR device; and the controller is further configured to determine the target emissions gas conversion ratio of the SCR device based on the aging time of the SCR device.

16. The emissions reduction system according to claim 13, wherein the controller is further configured to analyze and determine an excessive amount of the reduction agent slip downstream of the SCR device; and the controller is further configured to adjust the operating emissions gas conversion ratio to the target emissions gas conversion ratio by adjusting the injection amount of the reduction agent to the SCR device based on the excess amount of the reduction agent slip.

17. The emissions reduction system according to claim 13, wherein the controller is further configured to determine an aging time of the SCR device having the obtained operating time at the obtained operating temperature with respect to a reference temperature.

18. The emissions reduction system according to claim 13, wherein the controller is further configured to adjust the operating emissions gas conversion ratio of the SCR device to the target emissions gas conversion ratio in one or more iterations each of which adjusts the injection amount of the reduction agent to SCR device with a step amount.

19. A system for use with a Selective Catalytic Reduction (SCR) device iii an internal combustion engine, comprising:
means for monitoring operating conditions of the SCR device wherein the operating conditions comprise an operating time and an operating temperature of the SCR device;
means for determining an operating emissions gas conversion ratio of the SCR device;
means for calculating a number of active sites for catalytic reaction of the SCR device at the operating time and the operating temperature of the SCR device;
means for determining an aging time of the SCR device based on the calculated number of active sites for catalytic reaction at the operating time at the operating temperature of the SCR device;
means for determining a target emissions conversion ratio of the SCR device based on the monitored operating conditions of the SCR device; and
means for adjusting an injection amount of the reduction agent to the SCR device necessary for maintaining the target emissions gas conversion ratio of the SCR device when an excess amount of the reduction agent downstream of the SCR device is not negligible.

20. The controller according to claim 19, comprising
means for determining an aging time of the SCR device having the operating time at the operating temperature with respect to a reference temperature;
means for analyzing and determining an excess amount of the reduction agent downstream of the SCR device; and means for adjusting the injection amount of the reduction agent to the SCR device necessary for maintaining the target emissions gas conversion ratio of the SCR device when the excess amount of the reduction agent downstream of the SCR device is not negligible.

* * * * *